(12) United States Patent
Eaton et al.

(10) Patent No.: US 8,175,333 B2
(45) Date of Patent: May 8, 2012

(54) ESTIMATOR IDENTIFIER COMPONENT FOR BEHAVIORAL RECOGNITION SYSTEM

(75) Inventors: John Eric Eaton, Houston, TX (US); Wesley Kenneth Cobb, The Woodlands, TX (US); Rajkiran K. Gottumukkal, Houston, TX (US); Ming-Jung Seow, Houston, TX (US); Tao Yang, Katy, TX (US); Kishor Adinath Saitwal, Houston, TX (US)

(73) Assignee: Behavioral Recognition Systems, Inc., Houston, TX (US)

( * ) Notice: Subject to any disclaimer, the term of this patent is extended or adjusted under 35 U.S.C. 154(b) by 831 days.

(21) Appl. No.: 12/208,526

(22) Filed: Sep. 11, 2008

(65) Prior Publication Data

US 2009/0087027 A1 Apr. 2, 2009

Related U.S. Application Data

(60) Provisional application No. 60/975,560, filed on Sep. 27, 2007.

(51) Int. Cl.
*G06K 9/00* (2006.01)
(52) U.S. Cl. ........................................ 382/103
(58) Field of Classification Search .................... 382/103
See application file for complete search history.

(56) References Cited

U.S. PATENT DOCUMENTS

| | | |
|---|---|---|
| 4,679,077 A | 7/1987 | Yuasa et al. |
| 5,113,507 A | 5/1992 | Jaeckel |
| 5,748,775 A | 5/1998 | Tsuchikawa et al. |
| 5,751,378 A | 5/1998 | Chen et al. |
| 5,969,755 A | 10/1999 | Courtney |
| 6,252,974 B1 | 6/2001 | Martens et al. |
| 6,263,088 B1 | 7/2001 | Crabtree et al. |
| 6,570,608 B1 | 5/2003 | Tserng |
| 6,661,918 B1 | 12/2003 | Gordon et al. |
| 6,674,877 B1 | 1/2004 | Jojic et al. |
| 6,678,413 B1 | 1/2004 | Liang et al. |
| 6,856,249 B2 | 2/2005 | Strubbe et al. |
| 6,940,998 B2 | 9/2005 | Garoutte |
| 7,024,033 B2 | 4/2006 | Li et al. |
| 7,076,102 B2 | 7/2006 | Lin et al. |

(Continued)

FOREIGN PATENT DOCUMENTS

WO 2009049314 A2 4/2009

OTHER PUBLICATIONS

S. Apewokin, et al. "Multimodal Mean Adaptive Backgrounding for Embedded Real-Time Video Surveillance," (2007) IEEE 6 pages.

(Continued)

*Primary Examiner* — Brian Werner
*Assistant Examiner* — Nirav G Patel
(74) *Attorney, Agent, or Firm* — Patterson & Sheridan, LLP

(57) ABSTRACT

An estimator/identifier component for a computer vision engine of a machine-learning based behavior-recognition system is disclosed. The estimator/identifier component may be configured to classify an object being one of two or more classification types, e.g., as being a vehicle or a person. Once classified, the estimator/identifier may evaluate the object to determine a set of kinematic data, static data, and a current pose of the object. The output of the estimator/identifier component may include the classifications assigned to a tracked object, as well as the derived information and object attributes.

22 Claims, 6 Drawing Sheets

U.S. PATENT DOCUMENTS

| | | | |
|---|---|---|---|
| 7,136,525 | B1 | 11/2006 | Toyama et al. |
| 7,158,680 | B2 | 1/2007 | Pace |
| 7,200,266 | B2 | 4/2007 | Ozer et al. |
| 7,227,893 | B1 | 6/2007 | Srinivasa et al. |
| 7,436,887 | B2 | 10/2008 | Yeredor et al. |
| 7,825,954 | B2 | 11/2010 | Zhang et al. |
| 7,868,912 | B2 | 1/2011 | Venetianer et al. |
| 2003/0107650 | A1 | 6/2003 | Colmenarez et al. |
| 2004/0151342 | A1 | 8/2004 | Venetianer et al. |
| 2005/0001759 | A1 | 1/2005 | Khosla |
| 2005/0105765 | A1 | 5/2005 | Han et al. |
| 2005/0240629 | A1 | 10/2005 | Gu et al. |
| 2006/0018516 | A1 | 1/2006 | Masoud et al. |
| 2006/0165386 | A1 | 7/2006 | Garoutte |
| 2006/0190419 | A1 | 8/2006 | Bunn et al. |
| 2006/0222206 | A1 | 10/2006 | Garoutte |
| 2008/0002856 | A1 | 1/2008 | Ma et al. |
| 2008/0074496 | A1* | 3/2008 | Venetianer et al. ........... 348/150 |
| 2008/0181453 | A1 | 7/2008 | Xu et al. |
| 2008/0181499 | A1 | 7/2008 | Yang et al. |
| 2008/0193010 | A1 | 8/2008 | Eaton et al. |
| 2008/0240496 | A1 | 10/2008 | Senior |
| 2008/0252723 | A1 | 10/2008 | Park |
| 2008/0310737 | A1* | 12/2008 | Han et al. ...................... 382/224 |
| 2009/0022364 | A1 | 1/2009 | Swaminathan et al. |
| 2009/0067716 | A1 | 3/2009 | Brown et al. |
| 2009/0210367 | A1 | 8/2009 | Armstrong et al. |
| 2009/0297023 | A1 | 12/2009 | Lipton et al. |
| 2009/0324107 | A1 | 12/2009 | Walch |
| 2010/0063949 | A1 | 3/2010 | Eaton et al. |

OTHER PUBLICATIONS

Ismail Haritaoglu, et al. "W4: Real-Time Surveillance of People and Their Activities," IEEE Transactions on Pattern Analysis and Machine Intelligence, vol. 22, No. 8 (Aug. 2000), pp. 809-830.

Pentti Kanerva, "Sparse Distributed memory and Related Models," M.H. Hassoun, ed., Associative Neural Memories: Theory and Implementation, pp. 50-76. New York: Oxford University Press (1993).

J. Connell et al., "Detection and Tracking in the IBM PeopleVision System," IEEE ICME, Jun. 2004: pp. 1-4, <http://www.research.ibm.com/peoplevision>.

Helmut Grabner et al., "On-line Boosting and Vision," IEEE Conference on Computer Vision and Pattern Recognition (CVPR), 2006, vol. 1: pp. 260-267.

Ismail Haritaoglu et al., "Ghost: A Human Body Part Labeling System Using Silhouettes," 14th Annual International Conference on Pattern Recognition, Aug. 1998: pp. 77-82.

Richard Nock et al., "Statistical Region Merging," IEEE Transactions on Pattern Analysis and Machine Intelligence, Nov. 2004, vol. 26(11): pp. 1452-1458.

Elgammal et al. "Non-parametric Model for Background Substraction," Computer Vision Laboratory, University of Maryland; Jun. 2000; 17 pages, College Park, MD US.

Ivanov et al. "Video Surveillance of Interactions," MIT Media Laboratory, Cambridge, MA, Jul. 1999; 8 pages, Fort Collins, CO US.

Chris Stauffer et al., "Adaptive background mixture models for real-time tracking," Proceedings IEEE Conference on Computer Vision and Pattern Recognition, 1999: pp. 246-252.

Senior et al. "Appearance Models for Occlusion Handling," IBM T.J. Watson Research Center, 2001, 8 pages, Yorktown, Heights, NY US.

Chris Stauffer et al., "Learning Patterns of Activity Using Real-Time Tracking," IEEE Transactions on Pattern Analysis and Machine Intelligence (TPAMI), Aug. 2000, vol. 22(8): 747-757.

* cited by examiner

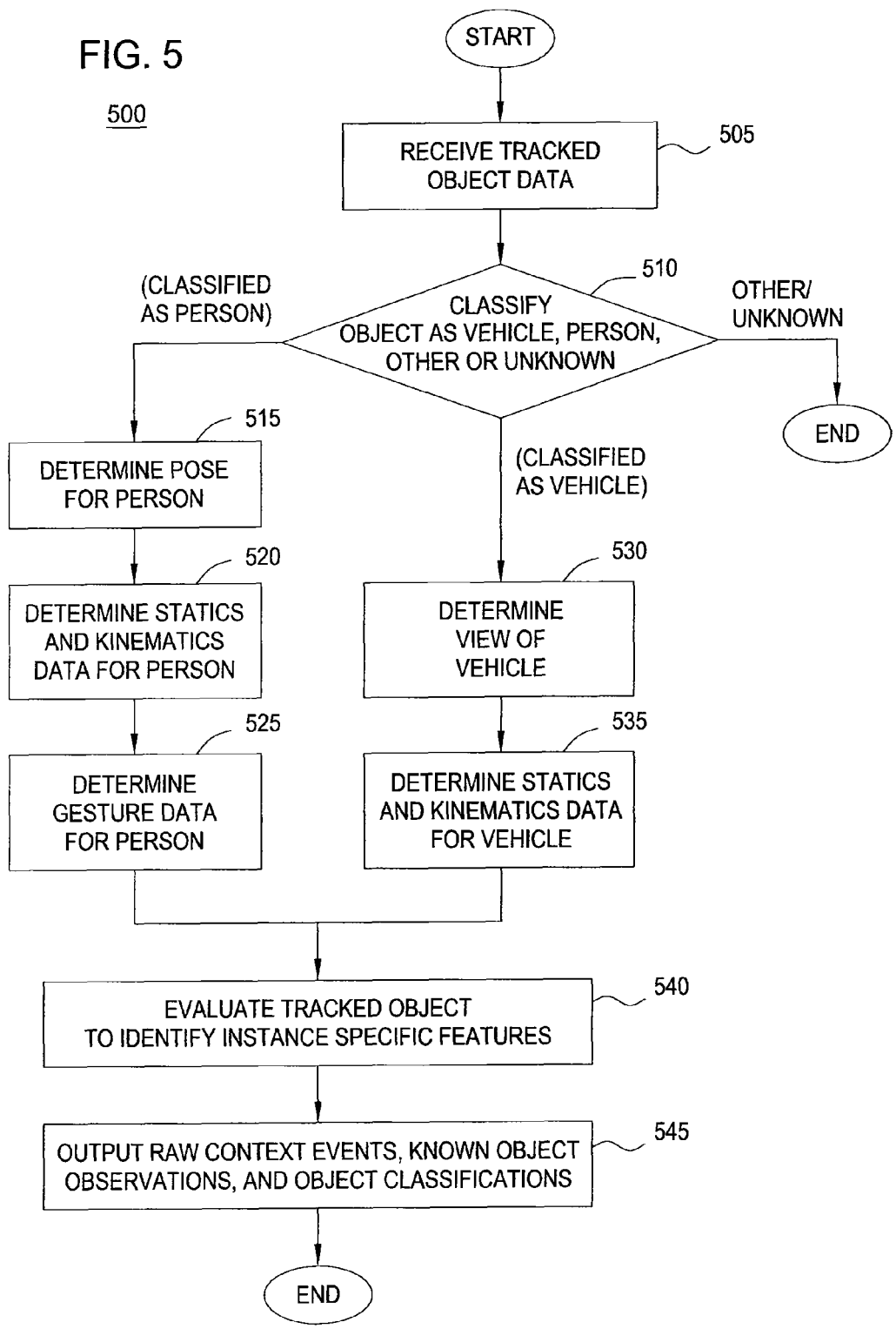

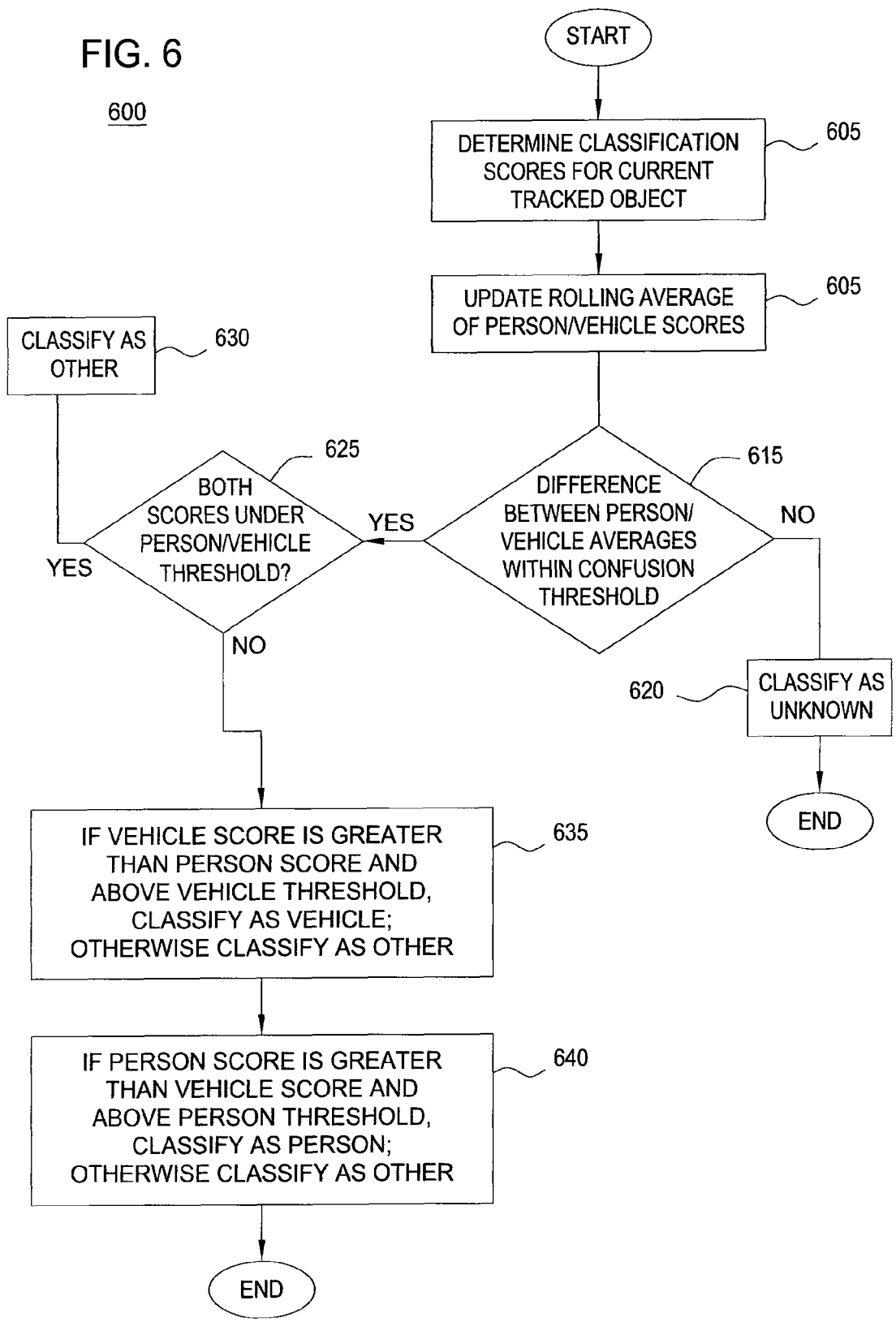

ESTIMATOR IDENTIFIER COMPONENT FOR BEHAVIORAL RECOGNITION SYSTEM

CROSS REFERENCE TO RELATED APPLICATIONS

This application claims benefit of U.S. Provisional Patent Application Ser. No. 60/975,560 filed Sep. 27, 2007. This application also relates to commonly assigned, co-pending U.S. patent application Ser. No. 12/028,484 filed Feb. 8, 2008, entitled "Behavioral Recognition System", both of which are incorporated herein by reference in their entirety.

BACKGROUND OF THE INVENTION

Field of the Invention

Embodiments of the invention provide an estimator identifier component for a behavioral recognition system. More specifically, embodiments of the invention relate to techniques for classifying objects depicted in a sequence of video frames and for determining a set of attributes or properties about an object tracked over a sequence of video frames.

Some currently available video surveillance systems provide simple object recognition capabilities. For example, some currently available systems are configured to find and track objects moving within a sequence of video frame using a frame-by-frame analysis. These systems typically acknowledge the need to isolate foreground images from background images (i.e., for identifying portions of a scene that depict activity (e.g., people, vehicles, etc.) and portions that depict fixed elements of the scene (e.g., a road or a subway platform). The background essentially provides a stage upon which activity occurs. Contiguous regions of the scene that contain a portion of scene foreground (referred to as a foreground "blob") are identified, and a given "blob" may be matched from frame-to-frame as depicting the same object. That is, the "blob" is tracked as it moves from frame-to-frame within the scene. Once identified, a "blob" may be tracked from frame-to-frame in order to follow the movement of the "blob" over time, e.g., a person walking across the field of vision of a video surveillance camera.

To analyze the behavior of these objects, however, it is simply insufficient to follow a position of given object moving about the scene. To be effective, a video surveillance system needs to be able to derive a variety of data and metadata about what is actually depicted in the scene. Further, this information needs to be derived in a quick and efficient manner as the video is captured at a real-time frame rate.

Some video surveillance systems may be able to determine when an object has engaged in certain predefined behaviors or otherwise characterize an object in some way. However, such surveillance systems typically require that the objects and/or behaviors which may be recognized by the system to be defined in advance. Thus, in practice, these systems simply compare recorded video to predefined definitions for objects and/or behaviors. In other words, unless the underlying system includes a description of a particular object or behavior, the system may not recognize that behavior (or at least instances of the pattern describing the particular object or behavior). Thus, to recognize additional objects or behaviors, separate software products may need to be developed. This results in surveillance systems with recognition capabilities that are labor intensive and prohibitively costly to maintain or adapt for different specialized applications. Further, such systems are often unable to associate related aspects from different patterns of observed behavior, e.g., to learn to identify behavior being repeatedly performed by a criminal prior to breaking into cars parked in a parking lot. As a result, by restricting the range of objects that a system may recognize using a predefined set of patterns, many available video surveillance systems have been of limited usefulness.

SUMMARY OF THE INVENTION

Embodiments of the invention provide an estimator identifier component for a behavioral recognition system. In particular, one embodiment of the invention provides a method for analyzing an object being tracked in a sequence of video frames. The method may generally include receiving a representation of the tracked object, as depicted by a current video frame, of the sequence of video frames, evaluating the representation of the tracked object using at least a first classifier and a second classifier. The first classifier may be configured to determine a first classification score indicating whether the tracked object depicts an instance of a first classification type. The second classifier is configured to determine a second classification score indicating whether the tracked object depicts an instance of a second classification type. The method may also include determining a final classification value for the tracked object, based on the first and second classification scores and passing the final classification value for the tracked objects to a machine learning engine configured to identify patterns of behavior engaged in by the tracked object, based at least in part on the final classification value.

Another embodiment of the invention includes a computer-readable storage medium containing a program which, when executed by a processor, performs an operation for analyzing an object being tracked in a sequence of video frames. The operation may generally include receiving a representation of the tracked object, as depicted by a current video frame, of the sequence of video frames and also include evaluating the representation of the tracked object using at least a first classifier and a second classifier. The first classifier is may be configured to determine a first classification score indicating whether the tracked object depicts an instance of a first classification type. The second classifier may be configured to determine a second classification score indicating whether the tracked object depicts an instance of a second classification type. The operation may also include determining a final classification value for the tracked object, based on the first and second classification scores and passing the final classification value for the tracked objects to a machine learning engine configured to identify patterns of behavior engaged in by the tracked object, based at least in part on the final classification value.

Still another embodiment of the invention includes a system having a video input source. The video input source may be configured to provide a sequence of video frames, each depicting a scene. The system may also include a processor and a memory containing a computer vision engine, which when executed by the processor is configured to perform an operation for analyzing an object being tracked in a sequence of video frames. The operation may generally include receiving a representation of the tracked object, as depicted by a current video frame, of the sequence of video frames and also include evaluating the representation of the tracked object using at least a first classifier and a second classifier. The first classifier may be configured to determine a first classification score indicating whether the tracked object depicts an instance of a first classification type. The second classifier may be configured to determine a second classification score indicating whether the tracked object depicts an instance of a second classification type. The operation may also include determining a final classification value for the tracked object, based on the first and second classification scores and also include passing the final classification value for the tracked objects to a machine learning engine configured to identify patterns of behavior engaged in by the tracked object, based at least in part on the final classification value.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments illustrated in the appended drawings.

It is to be noted, however, that the appended drawings illustrate only typical embodiments of this invention and are therefore not to be considered limiting of its scope, for the invention may admit to other equally effective embodiments.

FIG. 5 further illustrates a method for the estimator/identifier component to classify objects moving about a scene, according to one embodiment of the invention.

FIG. 6 illustrates a method for a trained classifier component of the estimator/identifier to select a classification for an object being tracked by the computer vision engine, according to one embodiment of the invention.

DETAILED DESCRIPTION OF THE PREFERRED EMBODIMENTS

Figure 1:
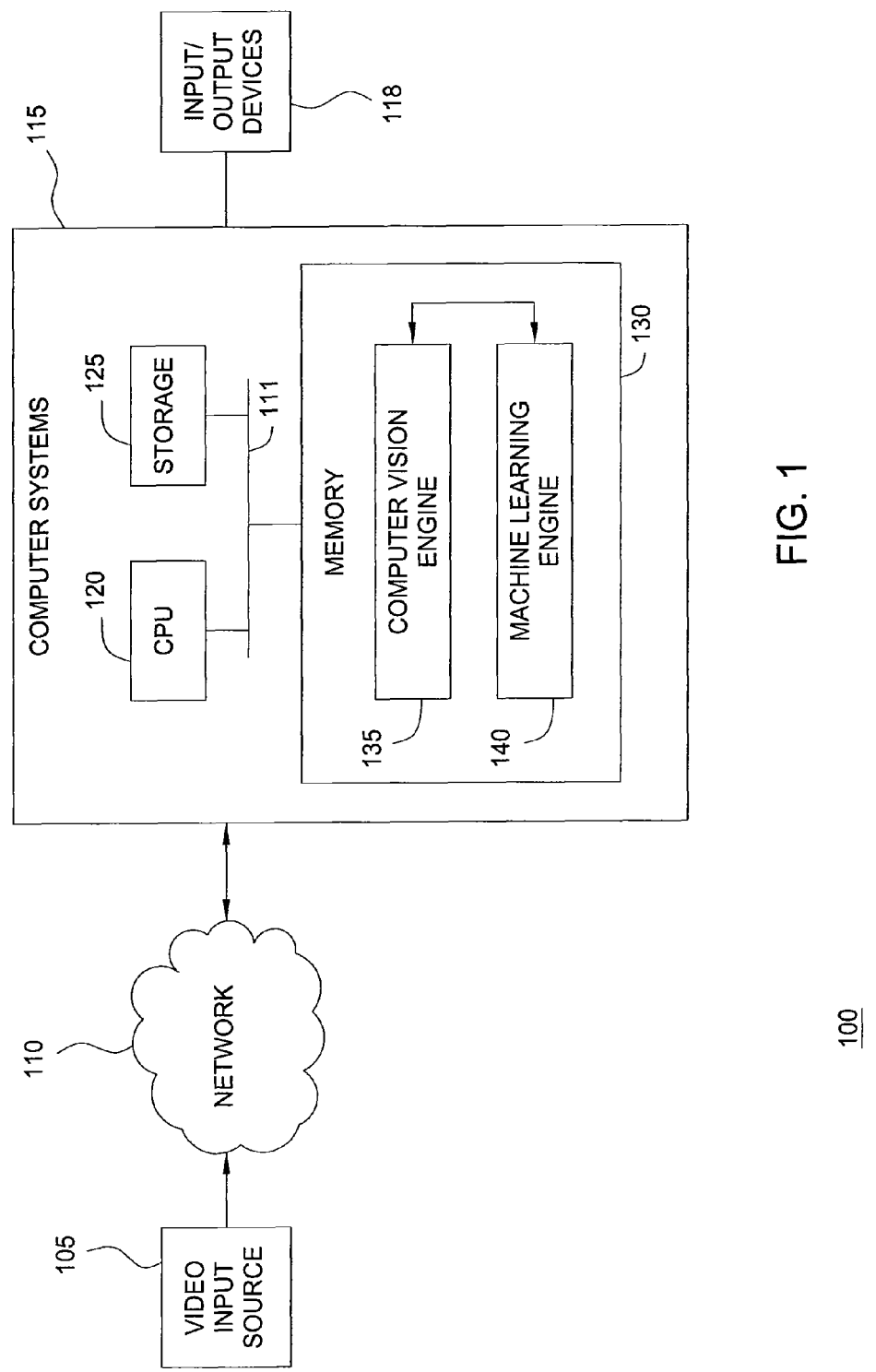
FIG. 1 illustrates components of a behavioral recognition system, according to one embodiment of the present invention.

Embodiments of the invention provide an estimator/identifier component for a computer vision engine of a machine-learning based behavior-recognition system. The behavior-recognition system may be configured to learn, identify, and recognize patterns of behavior by observing a video stream (i.e., a sequence of individual video frames). This disclosure describes an estimator/identifier component of the behavior recognition system configured to classify objects depicted in the sequence of video frames and to derive or predict a variety of properties or attributes of such objects. As described, the estimator/identifier component is configured to classify and describe objects within a scene in a quick and efficient manner as video of the scene is captured at a real-time frame rate.

In one embodiment, the estimator/identifier component receives a current frame of video along with one or more tracked object models describing the position and appearance of the tracked objects. The estimator/identifier component then attempts to classify each tracked object as being something. For example, in one embodiment, the estimator/identifier may classify the object as depicting a vehicle, a person, an unknown or other object. Generally, an "other" object results when the estimator/identifier affirmatively determines that the object is neither a vehicle nor a person. Once classified, the estimator/identifier may evaluate the object to determine a set of kinematic data, static data, and a current pose of the object. For example, if classified as a person, the estimator/identifier may determine a movement rate and a height, for the person as well as whether the person appears to be standing, sitting, etc. If classified as a vehicle, the height, color, and view (e.g., front, rear, side) of the vehicle may be determined. Further, the estimator may also determine class-specific attributes of the object, e.g., a gender of a person or a type of vehicle (e.g., a sedan, coupe, or truck). The output of the estimator/identifier may include the classifications assigned to the tracked objects, as well as the derived information and object attributes, referred to as a stream of raw context events.

Once the estimator/identifier component classifies objects being tracked in the scene, it may output this data to other components of the computer vision engine and/or the machine learning engine. As events occur, and re-occur, the machine learning engine may create, encode, store and reinforce patterns representing the events observed to have occurred. Further still, patterns representing an event of interest may result in alert to a user of the behavioral recognition system disclosed herein.

In the following, reference is made to embodiments of the invention. However, it should be understood that the invention is not limited to any specifically described embodiment. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks.

In general, the routines executed to implement the embodiments of the invention may be part of an operating system or a specific application, component, program, module, object, or sequence of instructions. The computer program of the present invention is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates components of a video analysis and behavior-recognition system 100, according to one embodiment of the present invention. As shown, the behavior-recognition system 100 includes a video input source 105, a network 110, a computer system 115, and input and output devices 118 (e.g., a monitor, a keyboard, a mouse, a printer, and the like). The network 114 may transmit video data recorded by the video input 112 to the computer system 115. Illustratively, the computer system 115 includes a CPU 120, storage 125 (e.g., a disk drive, optical disk drive, floppy disk drive, and the like), and a memory 130 containing a computer vision engine 135 and a machine learning engine 140. The computer vision engine 135 and the machine learning engine 140 may provide software applications configured to analyze a sequence of video frames provided by the video input 112.

Network 110 receives video data (e.g., video stream(s), video images, or the like) from the video input source 105. The video input source 105 may be a video camera, a VCR, DVR, DVD, computer, web-cam device, or the like. For example, the video input source 105 may be a stationary video camera aimed at a certain area (e.g., a subway station, a parking lot, a building entry/exit, etc.), which records the events taking place therein. Generally, the area visible to the camera is referred to as the "scene." The video input source 105 may be configured to record the scene as a sequence of individual video frames at a specified frame-rate (e.g., 24 frames per second), where each frame includes a fixed number of pixels (e.g., 320×240). Each pixel of each frame may specify a color value (e.g., an RGB value) or grayscale value. Further, the video stream may be formatted using known such formats e.g., MPEG2, MJPEG, MPEG4, H.263, H.264, and the like.

As described in greater detail below, the computer vision engine 135 may be configured to analyze this raw information to identify active objects in the video stream, classify the objects, derive a variety of metadata regarding the actions and interactions of such objects, and supply this information to a machine learning engine 140. In turn, the machine learning engine 140 may be configured to evaluate, observe, learn and remember details regarding events (and types of events) that transpire within the scene over time.

In one embodiment, the machine learning engine 140 receives the video frames and the results generated by the computer vision engine 135. The machine learning engine 140 may be configured to analyze the received data, build semantic representations of events depicted in the video frames, detect patterns, and, ultimately, to learn from these observed patterns to identify normal and/or abnormal events. In one embodiment, data describing whether a normal/abnormal behavior/event has been determined and/or what such behavior/event is may be provided to output devices 118 to issue alerts, for example, an alert message presented on a GUI interface screen. In general, the computer vision engine 135 and the machine learning engine 140 both process video data in real-time. However, time scales for processing information by the computer vision engine 135 and the machine learning engine 140 may differ. For example, in one embodiment, the computer vision engine 135 processes the received video data frame-by-frame, while the machine learning engine 140 processes data every N-frames. In other words, while the computer vision engine 135 analyzes each frame in real-time to derive a set of information about what is occurring within a given frame, the machine learning engine 140 is not constrained by the real-time frame rate of the video input.

Note, however, FIG. 1 illustrates merely one possible arrangement of the behavior-recognition system 100. For example, although the video input source 105 is shown connected to the computer system 115 via the network 110, the network 110 is not always present or needed (e.g., the video input source 105 may be directly connected to the computer system 115). Further, various components and modules of the behavior-recognition system 100 may be implemented in other systems. For example, in one embodiment, the computer vision engine 135 may be implemented as a part of a video input device (e.g., as a firmware component wired directly into a video camera). In such a case, the output of the video camera may be provided to the machine learning engine 140 for analysis. Similarly, the output from the computer vision engine 135 and machine learning engine 140 may be supplied over computer network 110 to other computer systems. For example, the computer vision engine 135 and machine learning engine 140 may be installed on a server system and configured to process video from multiple input sources (i.e., from multiple cameras). In such a case, a client application 250 running on another computer system may request (or receive) the results of over network 110.

Figure 2:
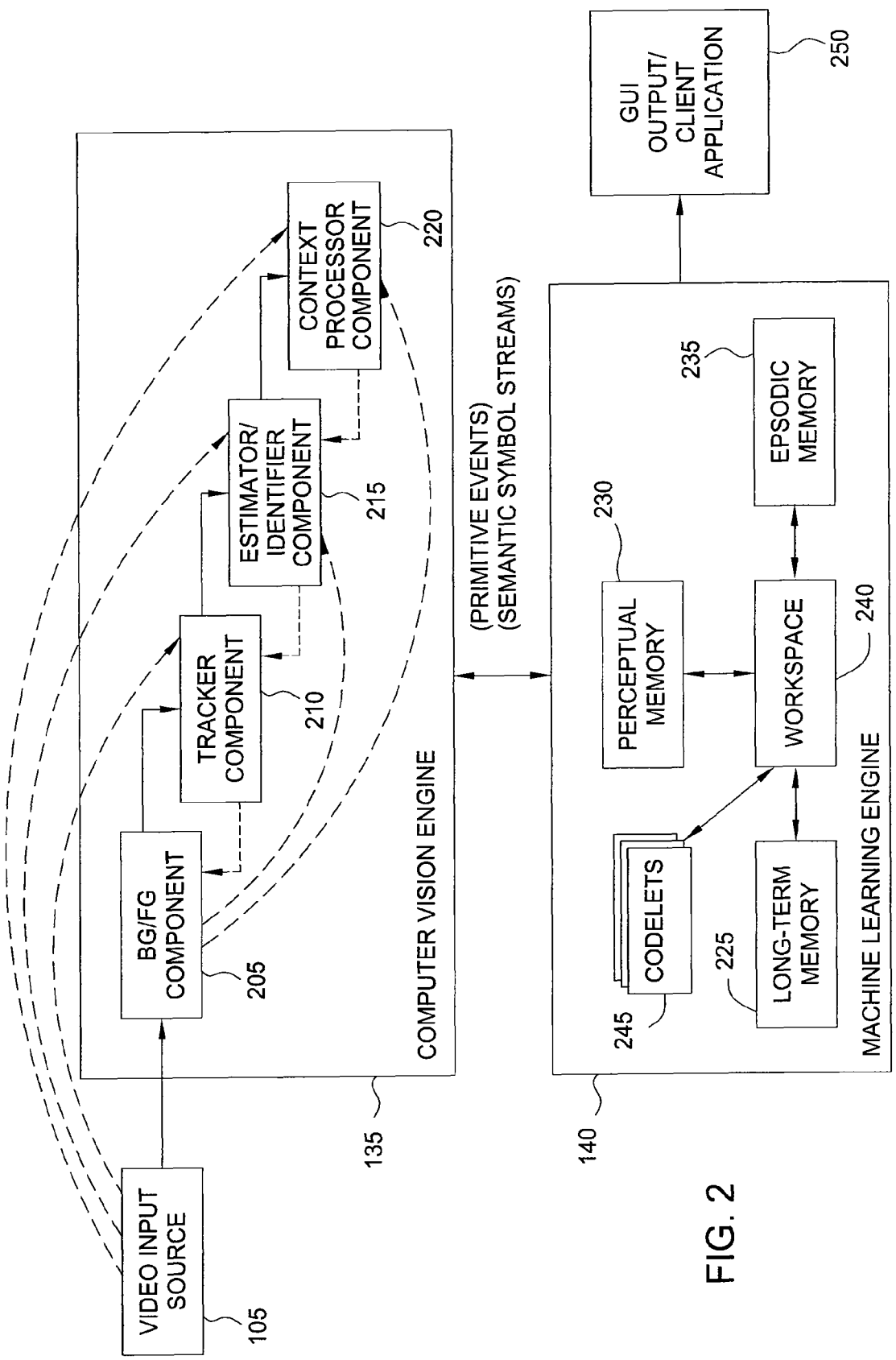
FIG. 2 further illustrates a computer vision engine and a machine learning engine of the behavioral recognition system shown in FIG. 1, according to one embodiment of the present invention.

FIG. 2 further illustrates components of the computer vision engine 135 and the machine learning engine 140 first illustrated in FIG. 1, according to one embodiment of the present invention. As shown, the computer vision engine 135 includes a background/foreground (BG/FG) component 205, a tracker component 210, an estimator/identifier component 215, and a context processor component 220. Collectively, the components 205, 210, 215, and 220 provide a pipeline for processing an incoming sequence of video frames supplied by the video input source 105 (indicated by the solid arrows linking the components). Additionally, the output of one component may be provided to multiple stages of the component pipeline (as indicated by the dashed arrows). In one embodiment, the components 205, 210, 215, and 220 may each provide a software module configured to provide the functions described herein. Of course one of ordinary skill in the art will recognize that the components 205, 210, 215, and 220 may be combined (or further subdivided) in a variety of ways to suit the needs of a particular case.

In one embodiment, the BG/FG component 205 may be configured to separate each frame of video provided by the video input source 105 into a stationary or static part (the scene background) and a collection of volatile parts (the scene foreground.) The frame itself may include a two-dimensional array of pixel values for multiple channels (e.g., RGB channels for color video or grayscale channels for black and white video). The BG/FG component 205 may be configured to generate a mask used to identify which pixels of the scene have been determined to depict foreground and, conversely, which pixels have been determined to depict scene background. The BG/FG component 205 then identifies regions of the scene that contain a portion of scene foreground (referred to as a foreground "blob" or "patch") and supplies this information to subsequent stages of the pipeline.

The tracker component 210 may receive the foreground patches produced by the BG/FG component 205 and generate computational models for the patches. The tracker component 210 may be configured to use this information, and each successive frame of raw-video, to attempt to track the motion of the objects depicted by the foreground patches as they move about the scene.

As described in greater detail below, the estimator/identifier component 215 may receive the output of the tracker component 210 and classify the tracked objects as being one of a known type of objects. For example, in one embodiment, estimator/identifier component 215 may classify a tracked object as being something (e.g., as being a "person," a "vehicle," or "unknown" or "other"). Further, the estimator/identifier component may identify characteristics of the tracked object, e.g., for a person, gender or whether the person is carrying an object. Of course, one of ordinary skill in the art will recognize that the estimator/identifier component 215 may be configured to classify a variety of different things, as needed to suit the needs of a particular case. For example, for a system used to observe a secure area at an airport facility, the estimator/identifier component 215 could, in addition to "person" and "vehicle," classify objects as "aircraft" or "baggage." Or as another example, a surveillance system at a rural farm could classify tracked objects as "cattle" or "horse" (with or without rider). More generally, the estimator/identifier component 215 may be configured to classify tracked objects as being one of two or more classifications, as being unknown, or as being other (i.e., as being not one of the two or more classifications).

The context processor component 220 may receive the result form other stages of the pipeline (i.e., the tracked objects, the background and foreground models, and the results of the estimator/identifier component 215). Using this information, the context processor 220 may be configured to generate an annotated map of the scene segmented into spatially separated regions. The regions may be labeled as natural or man-made and sorted according to a z-depth (i.e., regions may be determined to be in front of (or behind) other regions).

In one embodiment, the computer vision engine 135 may take the outputs of the components 205, 210, 215, and 220 and generate a symbolic representation describing the motions and actions of the tracked objects in the scene as a sequence of primitive behavioral events. For example, assume the computer vision engine 135 has identified a foreground object and classified that foreground object as being a vehicle. In such a case, the computer vision engine 135 may determine that the vehicle has engaged in some specified action. For example, a sequence of primitive events related to events occurring at a shopping-mall parking lot could include: "vehicle appears in scene," "vehicle moves to a given location," "vehicle stops moving," "person appears proximate to vehicle" "person moves," person leaves scene" "person appears in scene," "person moves proximate to vehicle," person disappears," "vehicle starts moving," and "vehicle disappears." This information, labeled in FIG. 2 as "primitive events" and "semantic symbol stream," is passed to the machine learning engine 140.

Illustratively, the machine learning engine 140 includes a long-term memory 225, a perceptual memory 230, an episodic memory 235, a workspace 240 and codelets 245. In one embodiment, the perceptual memory 230, the episodic memory 235, and the long-term memory 225 are used to identify patterns of behavior, evaluate events that transpire in the scene, and encode and store observations. Generally, the perceptual memory 230 receives the output of the computer vision engine 135. The episodic memory 235 stores data representing observed events with details related to a particular episode, e.g., information describing time and space details related on an event. That is, the episodic memory 235 may include details describing "what and where" something occurred within a scene such as a particular vehicle (car A) moved to a location believed to be a parking spot (parking spot 5) at 9:43 AM.

The long-term memory 225 may store data generalizing events observed in the scene. To continue with the example of a vehicle parking, the long-term memory 225 may encode information capturing observations and generalizations learned by an analysis of the behavior of objects in the scene such as "vehicles tend to park in a particular place in the scene," "when parking vehicles tend to move a certain speed," and "after a vehicle parks, people tend to appear in the scene proximate to the vehicle," etc. Thus, the long-term memory 225 stores observations about what happens within a scene with much of the particular episodic details stripped away. In this way, when a new event occurs, memories from the episodic memory 235 and the long-term memory 225 may be used to relate and understand a current event, i.e., the new event may be compared with past experience, leading to both reinforcement, decay, and adjustments to the information stored in the long-term memory 225, over time. In a particular embodiment, the long-term memory 225 may be implemented as a sparse-distributed memory data structure.

Generally, the workspace 240 provides a computational engine for the machine learning engine 140. For example, the workspace 240 may be configured to copy information from the perceptual memory 230, retrieve relevant memories from the episodic memory 235 and the long-term memory 225, select and invoke the execution of one of the codelets 245. In one embodiment, each codelet 235 is a software program configured to evaluate different sequences of events and to determine how one sequence may follow (or otherwise relate to) another (e.g., a finite state machine). More generally, the codelet may provide a small software program configured to find interesting patterns. In turn, the codelet may create, reinforce, or modify memories in the episodic memory 225 and the long-term memory 230 (i.e., when a pattern is identified). By repeatedly scheduling codelets for execution, copying memories and percepts to/from the workspace 215, the machine learning engine 140 performs a cognitive cycle used to observe, and learn, about patterns of behavior that occur within the scene.

Figure 3:
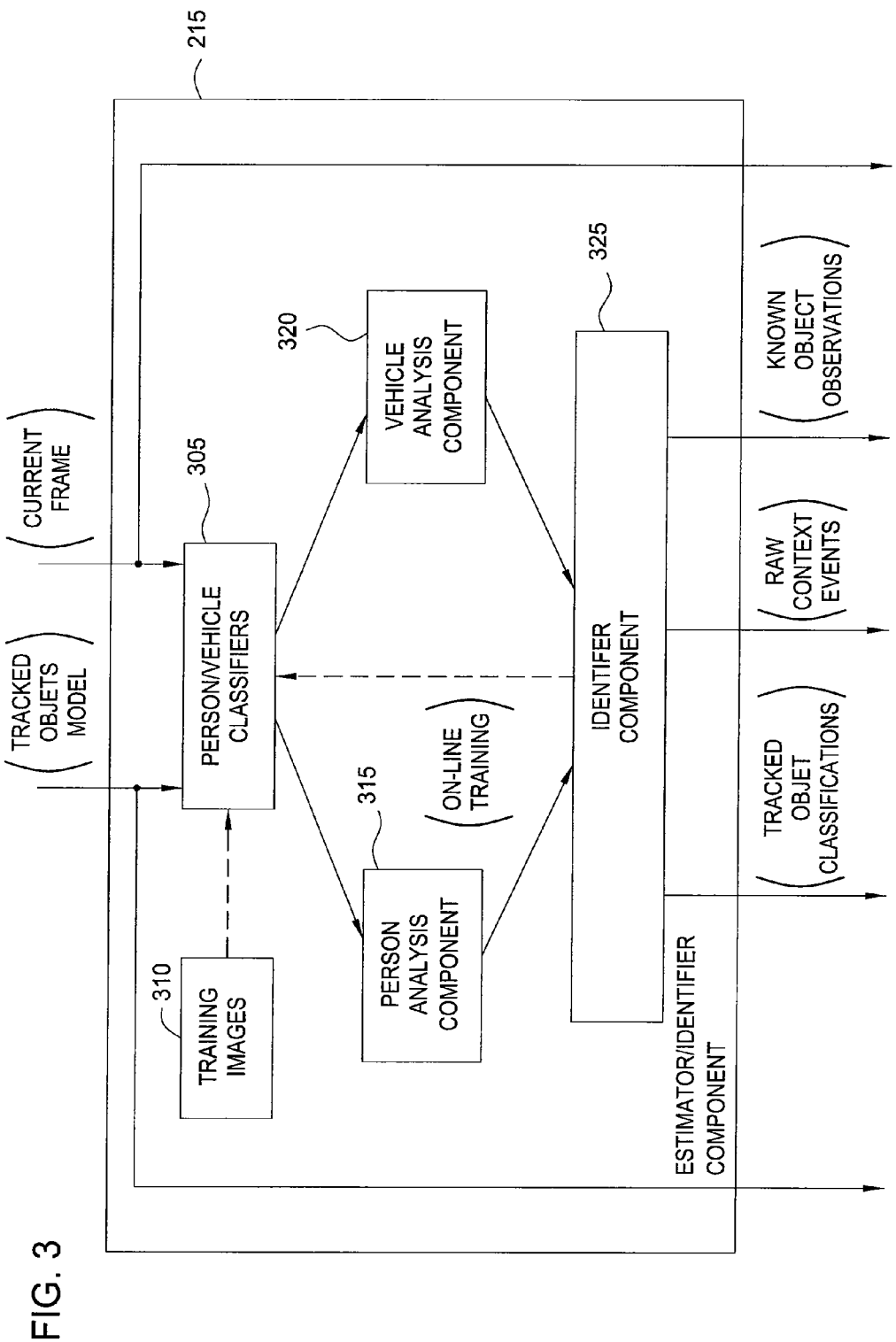
FIG. 3 illustrates an example embodiment of an estimator/identifier component of the computer vision engine shown in FIG. 2, according to one embodiment of the invention.

FIG. 3 illustrates an example embodiment of the estimator/identifier component 215 of the computer vision engine 135 shown in FIG. 2, according to one embodiment of the invention. As shown, the estimator/identifier component 215 includes person/vehicle classifiers 305, a set of training images 310, a person analysis component 315 a vehicle analysis tool 320, and an identifier component 325.

The person/vehicle classifiers 305 may use statistical techniques to determine how likely a given input depicts an instance of the classification type represented by the classifier. Known types of classifiers include a support vector machine. Illustratively, the training images 310 are shown being supplied to the person/vehicle classifiers 305. In one embodiment, the person/vehicle classifiers 305 may provide a software application configured to learn a set of features regarding a given class of objects from a collection of training examples (i.e., training images 310) known to be a positive or negative examples of the given class. For example, a person classifier may be trained using a set of images depicting persons (as positive examples of persons) and images depicting, among other things, vehicles (as negative examples of persons). Conversely, a vehicle classifier may be trained using a set of images depicting vehicles (as positive examples of vehicle) and images depicting, among other things, persons (as negative examples of vehicles). One example of a training strategy for the person/vehicle classifiers 305 is described below in conjunction with FIG. 4.

Once trained, the person/vehicle classifiers 305 may receive data describing an object being tracked in a sequence of video frames and output a classification of that tracked object. In one embodiment, the person/vehicle classifiers 305 may each assign a score representing how much the object appears to be a person (for the person classifier) or a vehicle (for the vehicle classifier). If the score assigned by both the person/vehicle classifiers 305 is below a minimum threshold, then the estimator/identifier 215 classifies the tracked object as "other" that is, as being neither a person nor a vehicle. Otherwise, if one of the classifiers assigns a score above a minimum threshold to the tracked object and the other assigns a score below the threshold, then the tracked object may be classified as the object type associated with the higher score. If both the classifiers assign a high score (i.e., above the minimum threshold for classifying the object as being of the class of the classifier) then the object may be classified as "unknown."

In one embodiment, the output of the person/vehicle classifier 305 provides a classification of a tracked object as being one of the classification types, e.g., a person or a vehicle. If the tracked object is classified as a person, the person analysis component 315 may be configured to analyze the object model of that object (e.g., the collection of pixels depicting the object over a sequence of frames and the metadata about the object generated by the components of the computer vision engine 135) and derive (or update) any number of properties or attributes of that object. For example, the person analysis component 315 may determine kinematic data related to the object over a number of frames, e.g., a direction and a velocity, as well as static data, e.g., a pose of the individual as standing, sitting, etc, an estimation of height/weight etc. Further, in one embodiment, the person analysis component 315 may also identify gestures made by the person over a sequence of frames e.g., is the person waving their arms or pointing at another object in the scene. Similarly, if the tracked object is classified as a vehicle, the vehicle analysis component 320 may be configured to analyze the object model of the object and derive any number of properties or attributes of that vehicle. Accordingly, kinematic and/or static data characterizing the vehicle may be determined. Of course, should the classifier 305 be configured to classify tracked objects using additional classes (e.g., aircraft, cattle, etc.), the estimator/identifier 215 may include additional analysis components.

As shown, estimator/identifier component 215 may include an identifier component 325. In one embodiment, the identifier component 325 may be configured to further evaluate objects classified by the person/vehicle classifiers 305 and analyzed by the analysis components 315 or 320. For example, in one embodiment, the identifier component may be configured to estimate the height, weight, and/or gender of an object classified as depicting a person. Similarly, the identifier may assign a type of car to a vehicle as being a sedan or an SUV. More generally, the identifier component 325 may be configured to evaluate the collection of information about an object including its classification type and information determined by the analysis tools and determine additional characteristics of the object and output a semantic description of that object or its activity within the scene. This output may be referred to as a stream of raw context events. For example, the output for a person could generally indicate that a male, 6' 0" in height is running while pointing at another object. This information could be evaluated by the machine learning engine as being interesting in some way (e.g., because it is atypical behavior for people in the scene being observed by the behavior recognition system). In such a case, the machine learning engine 140 could generate an alert to indicate that an event of interest has occurred.

Figure 4:
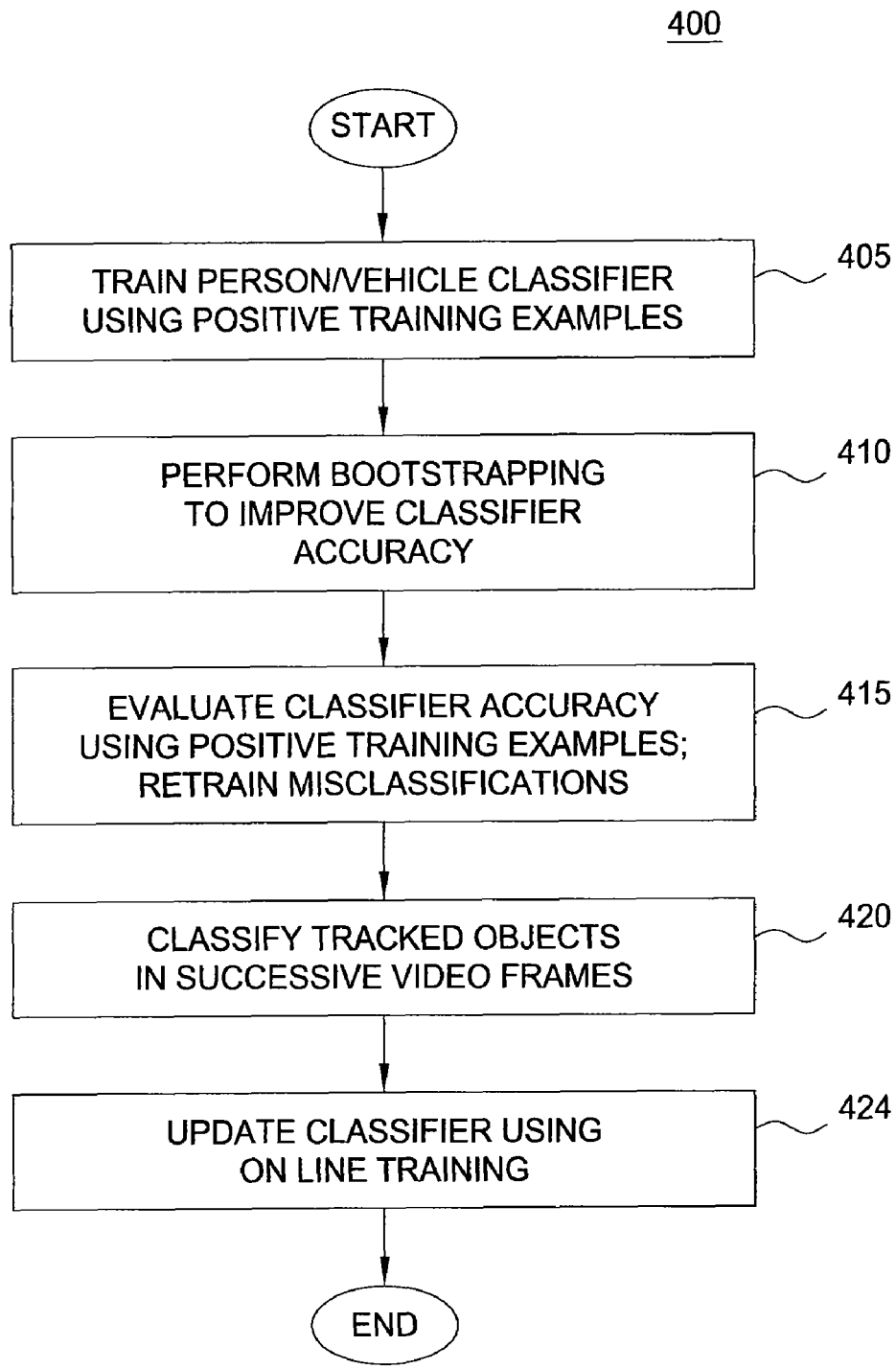
FIG. 4 illustrates a method for an estimator/identifier component to classify objects moving about a scene being tracked by a computer vision engine, as captured by a sequence of video frames, according to one embodiment of the invention.

FIG. 4 illustrates a method 400 for an estimator/identifier component to classify objects moving about a scene being tracked by a computer vision engine, as captured by a sequence of video frames, according to one embodiment of the invention. The method 400 provides an example training strategy for maintaining a classifier component (e.g., person/vehicle classifier 305 component) of a computer vision engine. As shown, the method 400 begins at step 405 where a person and/or vehicle classifier is trained using a collection of positive training examples. In one embodiment, the classifiers identify a set of features of the object class represented by the positive examples and derive a set of weights characterizing the relationship between each feature and the classification type (e.g., a person or a vehicle). For example, as is known, a boosting technique may use a collection of "weak" classifiers, each focused on a given feature of the object class to build a "strong" classifier. In a particular embodiment, the known "ADAboost" technique may be used. Of course, this or a variety of other statistical learning methods may be used. Once trained using the positive examples, the classifiers may be used to evaluate images and provide a score (i.e., a classification) specifying whether the classifier believes a given image depicts an instance of the object class (e.g., whether the image depicts a vehicle).

However, prior to being used, additional training steps may be performed to improve the accuracy of the classifiers. For example, at step 410, a bootstrapping technique may be used to refine the classifiers trained at step 405. As is known, bootstrapping refers to a process where the accuracy of a classifier is improved by supplying a set of negative training examples for classification, if the classifier correctly identifies the example as not being a member of the class (within a certain tolerance), then another negative example is provided. For example, the classifier scores an input using a continuous value from the range of –1 to 1, where anything between –1 and 0 means the classifier believes the input is not a member of the class, and conversely, where a positive value greater than 0 and up to 1 indicates that the classifier believes the input is a member of the class. The magnitude provides a measure of how "strongly" the classifier believes that an input is (or is not) a member of the class. In such a case, if the classifier incorrectly identifies the example as being a member of the class, then the classifier is trained using that example. The tolerance value may be initially set to a value such as 0.6, meaning that a positive classification between 0 and 0.6 does not result in retraining the classifier using the example. This process may be repeated for each negative training example. Then, the process may be repeated using a lower tolerance threshold, until the tolerance threshold reaches 0. Thus, this approach forces the classifiers to improve their ability to correctly recognize the negative examples as not being a member of the classification class.

At step 415, after the bootstrapping process is complete, the classifier may attempt to classify each positive training example. If the classifier incorrectly classifies a given positive training example (after the bootstrapping step) as not being a member of the class, then that example is provided as a positive training example and used to retrain the classifier. Doing so allows the weights for a given classifier to be adjusted in the event that it no longer recognizes the positive training examples as each being a member of the class as a result of adjustments made to the feature weights during the bootstrapping process.

At step 420, once trained, the classifier may be used to classify objects as being (or not being) a member of the classification classes, e.g., as being a person or a vehicle. At step 425, while classifying tracked objects, the classifiers may be updated using an on-line training technique. As is known, online training refers to a technique for improving the accuracy of a classifier being actively used to classify inputs.

FIG. 5 further illustrates a method 500 for the estimator/identifier component to classify objects being tracked in a sequence of video frames, according to one embodiment of the invention. As shown, the method 500 begins at step 505 where the person/vehicle classifier of the estimator/identifier component receives a representation of a tracked object. For example, the classifier may receive a set of pixels believed to depict the object in the current frame of video. Additionally, the classifier may receive an object identifier along with a current classification value assigned to that tracked object. In one embodiment, the classification value for the object may be accumulated as a rolling average of scores over a specified number of previous frames. If this is the first time a given object has been tracked (and now classified) the classifier may begin to determine a classification score for the object over a number of frames before outputting a classification for the object.

At step 510, the tracked object is classified as being one of a member of two or more classification types. For example, as described above, in one case the object may be classified as being a person or a vehicle. Further, the object may also in some cases be classified as being an "unknown" or an "other," where "other" means the classifier affirmatively believes the object is not one of the known classification types. If classified as unknown and other, this output may be provided to other components of the computer vision engine, and the method 500 ends. Otherwise, if the tracked object is classified as a person, then at step 515 a pose of the person may be determined e.g., standing, sitting, etc. At step 520, static and kinematic data may be determined for the person. And at step 525, gesture data may be determined for the person. Otherwise, if the classifier determines that the tracked object depicts a vehicle, then at step 530, the view of the vehicle may be determined, e.g., a front, rear, or side view, etc. At step 535, static and kinematic data may be determined for the vehicle. At step 540, data describing the now classified object (including the pose, view, static and kinematic data) may be evaluated to identify instance specific features of the object (e.g., the gender of a person or the general type of a vehicle). At step 545 the estimator/identifier component may output a semantic description of the tracked object received (at step 505) and classified (at step 510) and evaluated (at steps 515-540) or its activity within the scene. Thus, the output may include the object classification for the object, a set of raw context events, as well as a set of known observations regarding the object.

FIG. 6 illustrates a method 600 for a trained person/vehicle classifier component of the estimator/identifier component to select a classification for an object being tracked by the computer vision engine, according to one embodiment of the invention. As shown, the method begins at step 605 where the person/vehicle classifiers determine a classification score for a current tracked object. For example, as described above, the classification score for a tracked object may provide a value between −1 and 1 indicating how "strongly" the classifier believes the current tracked object is (or is not) an instance of the classification type of the classifier (i.e., a person or a vehicle). Thus, the person/vehicle classifier may generate two scores, one representing a score for the object as a person and one as a score for the object as a vehicle. At step 610, if the object has been classified for one or more previous frames, then a rolling average of scores may be updated with the classification scores determined at step 605. At step 615, a numerical difference between the person and vehicle classification scores is determined. If the difference is within a "confusion" threshold and either of the scores is strong enough to classify the object as being one of the classification types (i.e., as being a person or a vehicle), then the object is classified as "unknown" (step 620) This may occur where the vehicle classifier strongly classifies the object as being a "vehicle" (e.g., with a score of 0.8) and the person classifier also strongly classifies the object as being a "person" (e.g., with a score of 0.7). As both classifiers cannot both be accurate in such a case, the object is simply classified as unknown. Otherwise, if the difference between the classification scores is outside of the "confusion" threshold, then at step 625, the person/vehicle classifier determines whether both scores are below a classification threshold. If so, the object is then classified as "other" step 630. This result occurs where both classifiers strongly believe that the object is not an example of the classification type associated with the classifier, i.e., the object is neither a person nor a vehicle.

At step 635 if the vehicle score is greater than the person score, and the vehicle store is above a vehicle classification threshold, then the object is classified as a vehicle. Otherwise, the object is classified as an "other," i.e., neither a vehicle nor a person. Conversely, at step 640, if the person score is greater than the vehicle score, and the person score is above a person classification threshold, then the object is classified as a person. Otherwise, the object is classified as an "other," i.e., neither a vehicle nor a person.

Advantageously, as described herein, embodiments of the invention provide an estimator/identifier component for a computer vision engine of a machine-learning based behavior-recognition system. The behavior-recognition system may be configured to learn, identify, and recognize patterns of behavior by observing a video stream (i.e., a sequence of individual video frames). As described, the estimator/identifier component is configured to classify and describe objects within a scene in a quick and efficient manner as video of the scene is captured at a real-time frame rate. In one embodiment, the estimator/identifier component receives a current frame of video along with one or more tracked object models describing the position and appearance of the tracked objects. The estimator/identifier component then attempts to classify each tracked object as being something. Once classified, the estimator/identifier may evaluate the object to determine a set of kinematic data, static data, and a current pose of the object. The output of the estimator/identifier may include the classifications assigned to the tracked objects, as well as the derived information and object attributes, referred to as a stream of raw context events.

While the foregoing is directed to embodiments of the present invention, other and further embodiments of the invention may be devised without departing from the basic scope thereof, and the scope thereof is determined by the claims that follow.

What is claimed is:

1. A method for analyzing an object being tracked in a sequence of video frames, comprising:
   receiving a representation of the tracked object, as depicted by a current video frame, of the sequence of video frames;
   evaluating, by operation of one or more computer processors, the representation of the tracked object using at least a first classifier and a second classifier, wherein the first classifier is configured to determine a first classification score indicating whether the tracked object depicts an instance of a first classification type, and wherein the second classifier is configured to determine a second classification score indicating whether the tracked object depicts an instance of a second classification type;

adding the first classification score to a first rolling average, wherein the first rolling average provides an average of the first classification score determined for the tracked object for each of a specified number of previous video frames, of the plurality of;

adding the second classification score to a second rolling average, wherein the second rolling average provides an average of the second classification score determined for the tracked object for each of a specified number of previous video frames, of the plurality, wherein the final classification value is determined from the first rolling average and the second rolling average;

determining a final classification value for the tracked object in the current video frame, based on the first and second rolling averages; and passing the final classification value for the tracked objects to a machine learning engine configured to identify patterns of behavior engaged in by the tracked object, based at least in part on the final classification value.

2. The method of claim 1, wherein the first classification type comprises a vehicle and the second classification type comprises a person.

3. The method of claim 1, further comprising, analyzing the tracked object to determine one or more instance-specific attributes of the object depicted in the sequence of video frames based on a final classification value indicating that the tracked object depicts one of vehicle or a person.

4. The method of claim 1, wherein the final classification value specifies that the tracked object depicts one of a car, a person, an unknown-object, or an other-object.

5. The method of claim 4, wherein the classification value of other-object indicates that the tracked object does not depict an instance of either the first classification type or the second classification type.

6. The method of claim 1, further comprising:
training the first classifier using a set of positive training examples depicting instances of the first classification type;
training the second classifier using a set positive training examples depicting instances of the second classification type;
providing a first set of negative training examples and a second set of negative training examples to the first and second classifiers, respectively, for classification;
for each negative training example incorrectly classified by the first classifier, training the first classifier on the incorrectly classified negative training examples; and
for each negative training example incorrectly classified by the second classifier, training the second classifier on the incorrectly classified negative training examples.

7. The method of claim 6, further comprising:
providing the set of positive training examples depicting instances of the first classification type to the first classifier for classification;
providing the set of positive training examples depicting instances of the second classification type to the second classifier for classification;
for each positive training example incorrectly classified by the first classifier, training the first classifier on the incorrectly classified positive training examples; and for each positive training example incorrectly classified by the second classifier, training the second classifier on the incorrectly classified positive training examples.

8. The method of claim 1, wherein the representation of the tracked object includes a plurality of pixel position values and a plurality of pixel color values for pixels which depict the object in the current frame of video.

9. A non-transitory computer-readable storage medium containing a program which, when executed by a processor, performs an operation for analyzing an object being tracked in a sequence of video frames, the operation comprising: receiving a representation of the tracked object, as depicted by a current video frame, of the sequence of video frames; evaluating the representation of the tracked object using at least a first classifier and a second classifier, wherein the first classifier is configured to determine a first classification score indicating whether the tracked object depicts an instance of a first classification type, and wherein the second classifier is configured to determine a second classification score indicating whether the tracked object depicts an instance of a second classification type; determining a final classification value for the tracked object, based on the first and second classification scores; and passing the final classification value for the tracked objects to a machine learning engine configured to identify patterns of behavior engaged in by the tracked object, based at least in part on the final classification value.

10. The non-transitory computer-readable storage medium of claim 9, wherein the first classification type comprises a vehicle and the second classification type comprises a person.

11. The non-transitory computer-readable storage medium of claim 10, wherein the operation further comprises, analyzing the tracked object to determine one or more instance-specific attributes of the object depicted in the sequence of video frames based on a final classification value indicating that the tracked object depicts one of vehicle or a person.

12. The non-transitory computer-readable storage medium of claim 9, wherein the final classification value specifies that the tracked object depicts one of a car, a person, an unknown-object, or an other-object.

13. The non-transitory computer-readable storage medium of claim 12, wherein the classification value of other-object indicates that the tracked object does not depict an instance of either the first classification type or the second classification type.

14. The non-transitory computer-readable storage medium of claim 9, wherein the operation further comprises: training the first classifier using a set of positive training examples depicting instances of the first classification type; training the second classifier using a set positive training examples depicting instances of the second classification type; providing a first set of negative training examples and a second set of negative training examples to the first and second classifiers, respectively, for classification; for each negative training example incorrectly classified by the first classifier, training the first classifier on the incorrectly classified negative training examples; for each negative training example incorrectly classified by the second classifier, training the second classifier on the incorrectly classified negative training examples.

15. The non-transitory computer-readable storage medium of claim 14, wherein the operation further comprises: providing the set of positive training examples depicting instances of the first classification type to the first classifier for classification; providing the set of positive training examples depicting instances of the second classification type to the second classifier for classification; for each positive training example incorrectly classified by the first classifier, training the first classifier on the incorrectly classified positive training examples; and for each positive training example incorrectly classified by the second classifier, training the second classifier on the incorrectly classified positive training examples.

16. The non-transitory computer-readable storage medium of claim 9, wherein the representation of the tracked object includes a plurality of pixel position values and a plurality of pixel color values for pixels which depict the object in the current frame of video.

17. A system comprising,
a video input source configured to provide a sequence of video frames, each depicting a scene;
a processor; and
a memory containing a computer vision engine, which when executed by the processor is configured to perform an operation for analyzing an object being tracked in a sequence of video frames, the operation comprising:
receiving a representation of the tracked object, as depicted by a current video frame, of the sequence of video frames,
evaluating the representation of the tracked object using at least a first classifier and a second classifier, wherein the first classifier is configured to determine a first classification score indicating whether the tracked object depicts an instance of a first classification type, and wherein the second classifier is configured to determine a second classification score indicating whether the tracked object depicts an instance of a second classification type,
adding the first classification score to a first rolling average, wherein the first rolling average provides an average of the first classification score determined for the tracked object for each of a specified number of previous video frames, of the plurality of video frames,
adding the second classification score to a second rolling average, wherein the second rolling average provides an average of the second classification score determined for the tracked object for each of a specified number of previous video frames, of the plurality of video frames, wherein the final classification value is determined from the first rolling average and the second rolling average,
determining a final classification value for the tracked object in the current video frame, based on the first and second rolling averages, and
passing the final classification value for the tracked objects to a machine learning engine configured to identify patterns of behavior engaged in by the tracked object, based at least in part on the final classification value.

18. The system of claim 17, wherein the first classification type comprises a vehicle and the second classification type comprises a person.

19. The system of claim 17, wherein the final classification value specifies that the tracked object depicts one of a car, a person, an unknown-object, or an other-object, and wherein the classification value of other-object indicates that the tracked object does not depict an instance of either the first classification type or the second classification type.

20. The system of claim 17, wherein the operation further comprises:
training the first classifier using a set of positive training examples depicting instances of the first classification type;
training the second classifier using a set positive training examples depicting instances of the second classification type;
providing a first set of negative training examples and a second set of negative training examples to the first and second classifiers, respectively, for classification;
for each negative training example incorrectly classified by the first classifier, training the first classifier on the incorrectly classified negative training examples;
for each negative training example incorrectly classified by the second classifier, training the second classifier on the incorrectly classified negative training examples.

21. The system of claim 20, wherein the operation further comprises:
providing the set of positive training examples depicting instances of the first classification type to the first classifier for classification;
providing the set of positive training examples depicting instances of the second classification type to the second classifier for classification;
for each positive training example incorrectly classified by the first classifier, training the first classifier on the incorrectly classified positive training examples; and
for each positive training example incorrectly classified by the second classifier, training the second classifier on the incorrectly classified positive training examples.

22. The system of claim 17, wherein the representation of the tracked object includes a plurality of pixel position values and a plurality of pixel color values for pixels which depict the object in the current frame of video.

* * * * *

UNITED STATES PATENT AND TRADEMARK OFFICE
CERTIFICATE OF CORRECTION

PATENT NO.         : 8,175,333 B2
APPLICATION NO.    : 12/208526
DATED              : May 8, 2012
INVENTOR(S)        : Eaton et al.

It is certified that error appears in the above-identified patent and that said Letters Patent is hereby corrected as shown below:

In the CLAIMS:

Column 14, Claim 9, Line 14, please insert --, by operation of the processor,-- after evaluating;

Column 14, Claim 9, Line 21, please insert

--adding the first classification score to a first rolling average, wherein the first rolling average provides an average of the first classification score determined for the tracked object for each of a specified number of previous video frames, of the plurality of video frames;
adding the second classification score to a second rolling average, wherein the second rolling average provides an average of the second classification score determined for the tracked object for each of a specified number of previous video frames, of the plurality of video frames, wherein the final classification value is determined from the first rolling average and the second rolling average;-- after type;

Column 14, Claim 9, Line 22, please insert --in the current video frame-- after object;

Column 14, Claim 9, Lines 22-23, please delete "classification score" and insert --rolling averages-- therefor.

Signed and Sealed this
Twenty-second Day of January, 2013

David J. Kappos
*Director of the United States Patent and Trademark Office*